United States Patent Office 3,386,949
Patented June 4, 1968

3,386,949
CHEMICAL CROSSLINKING OF ETHYLENE
COPOLYMERS WITH DI-t-BUTYL DIPER-
OXYOXALATE
Edward C. Stivers, Atherton, Calif., assignor to Raychem
Corporation, Redwood City, Calif., a corporation of
California
No Drawing. Filed Oct. 22, 1965, Ser. No. 502,413
10 Claims. (Cl. 260—41)

ABSTRACT OF THE DISCLOSURE

Olefin polymers are crosslinked in the solid state by sequentially diffusing a first complementary-reactive material such as a hydroperoxide and a second complementary-reactive material such as an acid halide of a lower carboxylic acid into the polymer and then heating the polymer at a temperature below its melting point to crosslink the polymer.

This invention relates to the preparation of crosslinked polymers and especially polymers and copolymers of ethylene, with propylene, vinyl esters, esters of acrylic acids, etc., and more particularly to shaped articles thereof having improved resistance to high temperature, resistance to swelling and dissolution of organic liquids, and improved dimensional stability and ability to exhibit elastic memory by chemical treatment of said shaped polymeric articles.

It is well known that the usefulness of polyethylene and polyethylene copolymer shaped articles can be greatly extended by crosslinking. Crosslinking can be accomplished by such treatments as ionizing radiation or ultraviolet light in the presence of a photoactive agent. The crosslinking of polyethylene and shaped articles thereof bring about substantial improvement in the properties, including increased tensile strength, substantially reduced solubility, stress-crack resistance, improved thermal dimensional stability and the ability to exhibit elastic memory.

The crosslinking of polyethylenes or polyethylene copolymers by charged particle (i.e., electron) radiation suffers from certain disadvantages. In general, it is an expensive process and more importantly only shaped articles with some degree of geometric regularity, i.e., tubing and wire insulation, are successfully crosslinked when the source of radiation is charged particles such as electrons. With gamma radiation, this objection regarding geometric regularity is not so severely felt, but dose rates are generally very low with hours generally required for substantial and useful crosslinking and the process is considerably more expensive than high energy electron irradiation.

With ultraviolet light, in order to obtain effective or useful crosslinking, the object to be crosslinked must be reasonably transparent to ultraviolet light, precluding the use of fillers such as carbon black, flame retardant additives, color pigments, etc.

Chemical crosslinking of polyethylene can be accomplished by adding certain organic compounds to polyethylene such as peroxides or azide compounds, etc. These chemical crosslinking systems suffer, in general, the important disadvantage in that the crosslinking reaction must be carried out at temperatures higher than those necessary for fabrication of the article. Therefore, it is normal practice to incorporate a peroxide or other active chemical species into the polyethylene at a temperature where the polyethylene is melted but below the temperature where rapid decomposition of the peroxide or other chemical species occurs. Otherwise, crosslinking will be premature and prohibit subsequent fabrication. When using such a system, an article is fabricated first and then cured under pressure.

Another way to incorporate the crosslinking agent, as disclosed by the prior art in U.S. Patent 2,628,214, is to diffuse in a reactive crosslinking chemical agent by means of a solvent system. The shaped article so swollen with solvent and thermally unstable reactive crosslinking agent can then be heated below the melting point of the polyethylene, and a shaped crosslinked article results therefrom. The disadvantage to such a process is obviously the time-consuming evaporation of solvents. Furthermore, such solvent treatment often distorts the shaped article.

In summary then, for one reason or another, all of these crosslinking processes have certain disadvantages. Accordingly, it is a principal object of this invention to provide a novel and relatively simple technique for accomplishing the solid state crosslinking of polyethylene, polyethylene copolymers and shaped articles thereof being characterized by greatly improved heat distortion resistance, environmental stress-cracking resistance, solvent resistance, and the like. Such shaped articles can be used for purposes of electrical insulation, for corrosion protection, for performing mechanical tasks, etc.

It is a further object to provide a novel method of preparing crosslinked polymers to which can be imparted the property of elastic memory.

It is also an object of this invention to provide a novel and unique method for preparing such crosslinked hydrocarbon polymer materials.

It is also an object of this invention to provide a method of chemically crosslinking an article without the necessity of using pressure which is normally required to prevent porosity in the article.

It is also an object of this invention to provide a method of chemically crosslinking an article without distortion and without the necessity to contain the article during the crosslinking process.

Other objects will, it is believed, become apparent from the more detailed description which follows.

Briefly, the present invention comprehends the crosslinking of polyethylene polymers by effecting the synthesis of a reactive chemical crosslinking agent internally in the shaped polymeric article. This synthesis may be accomplished by the sequential diffusion into the polymer of at least two complementary reactive materials, preferably in the absence of solvent, to form in situ a crosslinking agent having a decomposition temperature below the melting point of the polymer and a rapid rate of decomposition at these temperatures. In general, the reactants which are sequentially diffused into the shaped ethylene polymer article are of themselves quite thermally stable relative to the species synthesized.

The expression "complementary reactive materials" in the above context refers to compounds which, alone, are not solid state crosslinking agents, but which are capable of forming such agents upon contact in the polymer with another different reactive material. The materials are normally of different functionality, i.e., an acyl halide and hydroperoxides, such that they will normally react with each other on contact. Hence, their reactivity may be said to be "complementary."

The concentrations of each complementary reactive material are of the order of three to four percent, and while not critical, it has been found that distortion of a shaped polymeric article is minimized at this concentration level. The concentration of the desired reactive chemical crosslinking agent synthesized in the fabricated article preferably should be present at a concentration generally of from about ½ to about 5 percent. The time and temperature used in the crosslinking treatment can be varied over fairly wide limits, usually at least about 10–30 degrees below the melting point of an ethylene resin. Some evolution of gas usually accompanies the synthesis as well as the decomposition of the synthesized cross-linking agent, but because the ethylene polymer is in the solid state, the crystalline or other interchain forces are sufficient to keep the article from bubbling or otherwise distorting.

The reactive chemical crosslinking agent that can be synthesized in the fabricated article is restricted only by the above-mentioned requirements; namely, diffusibility into the shaped article of the relatively thermal stable complementary reactive materials, and a facile synthesis in good yields of a thermally labile species capable of crosslinking the ethylene polymer. One such system I have found to be outstandingly effective for the crosslinking of polyethylene and related polymers is the "internal" synthesis of di-t-butyl diperoxyoxalate synthesized by the sequential addition of t-butyl hydroperoxide into the shaped article and subsequently oxalyl chloride. The di-t-butyl diperoxyoxalate is an extremely reactive peroxide which has a half time of decomposition of roughly twelve minutes at 55° C., and 1.8 minutes at 70° C., in contrast to peroxides normally used to commercially crosslink polyethylenes which have a half time decomposition of roughly 25,000 minutes at 70° C. In general, then, at the temperature at which it is formed it also decomposes rather rapidly.

It would be expected that other t-alkyl hydroperoxides are also effective as complementary reactive peroxide-forming materials with oxalyl chloride. Hydroperoxides of the general structure—

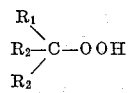

where $R_1$, $R_2$, and $R_3$ are aliphatic radicals (alkyl, cycloalkyl, and the like, preferably containing from 1 to about 10 carbon atoms) come within the scope of this invention. The radicals $R_1$, $R_2$, and $R_3$ can also be connected as for example

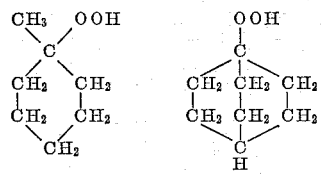

etc.

The other complementary reactive material is oxalyl chloride.

The crosslinking of both polyethylene and ethylene copolymers can be accomplished by this invention. The copolymer can contain comonomers such as propylene, butene-1, ethyl acrylate, or any other ethylenically unsaturated monomer copolymerizable with ethylene. The ethylene polymer can also contain many conventional additives including fillers such as carbon black, magnesium oxide, and titanium dioxide.

While not bound by any theory, it is believed that the following equations describe the formation of the crosslinking agent, its decomposition, and the crosslinking of the ethylene polymer which may take place in the practice of the present invention.

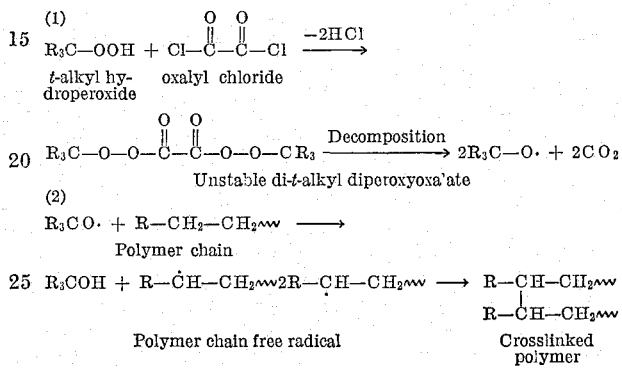

The crosslinked ethylene polymers of this invention are capable of having elastic memory characteristics imparted to them to provide heat-unstable articles which retain their form and dimensions under low or normal temperature conditions, but which upon heating to an elevated temperature change their form and return to their pre-treatment form and dimensions. Thus, the crosslinked articles of this invention may be said to be "recoverable" materials. There are several well-known methods according to which recoverable materials may be deformed such that they possess the property of elastic memory. One such method is disclosed in U.S. Patent No. 2,027,962, which is incorporated herein by reference. Any such method may be used to impart elastic memory properties to the crosslinked ethylene polymers of this invention.

The following examples illustrate the invention. In the examples, the parts and percentages are by weight unless otherwise indicated.

Example I

A 25-mil slab of DYNH polyethylene, a low density, medium molecular weight polyethylene manufactured by Union Carbide Plastics Co., was inserted into a test tube which contained t-butyl hydroperoxide of roughly 90 percent purity and the test tube was heated externally to 90°–92° C. by means of an oil bath. After thirty minutes, the slab was removed and allowed to cool to room temperature and it was determined by separate experiment that this treatment incorporates 3–4.5 percent of the hydroperoxide onto the polyethylene. The slab was then exposed to the vapor layer above refluxing oxalyl chloride (B.P. 64° C.) for approximately three minutes, and then placed in a forced air oven at 75° C. for 30 minutes. The slab had a modulus of elasticity (determined at 150° C.) of 44 p.s.i., a gel content of 46 percent as determined in refluxing xylene. Slabs treated with either t-butyl hydroperoxide or oxalyl chloride alone under these conditions showed no modulus of elasticity and no gel. The treated slab showed no distortion by such a crosslinking treatment.

Alterations in the degree of crosslinking were obtained by varying the contact time in the t-butyl hydroperoxide, the time and nature of the oxalyl chloride contact, and the nature of the post-treatment. Table 1 illustrates some of these variants.

copolymers were contacted with t-butyl hydroperoxide at 70° C., then oxalyl chloride liquid at approximately 22°

TABLE 1.—SLABS OF DYNH—25 MILS THICK. SOAKED WITH 90% PURE t-BUTYL HYDROPEROXIDE AT 90–92° C., THEN COOLED TO ROOM TEMPERATURE

| Oxalyl Chloride Contact Condition | Oxalyl Chloride Contact Time (min.) | Subsequent Treatment | Modulus of Elasticity (150°), p.s.i. | Slab Appearance | Percent Gel (Refluxing Xylene) |
|---|---|---|---|---|---|
| Vapor at 64° C | 3 | Forced draft oven at 75° C. for 30 minutes | 44 | Undistorted | 46 |
| Liquid at 22° C | 10 | do | 54 | do | 48 |
| Do | 10 | Over sodium hydroxide pellets for 1 hour in a desiccator. Then for ½ hour in a forced draft oven at 75° C. | 53 | do | 43 |

All of the crosslinked samples from Table 1 showed excellent elastic memory.

Example II

The bottoms of commercial 1 oz. low density polyethylene reagent bottles, made by a blow molding technique, were removed. The remaining cylindrical shaped articles were then subjected to a bath of t-butyl hydroperoxide at 90–92° C. for thirty minutes and then removed and cooled. Subsequently, after a period of hours, the hydroperoxide treated bottles were exposed to oxalyl chloride vapor at 64° C., or with oxalyl chloride liquid at 25° C. Finally, after the bottles had had contact with the acid halide reagent, they were heated for thirty minutes at 75° C. in a forced draft oven. The bottles (which showed no distortion) were then heated above the crystalline melting point of the polyethylene in a glycerine bath. The shaped objects did not flow nor distort but became elastomeric in nature. While still hot, the elastomeric-like bottles were expanded over a stainless steel mandrel and allowed to cool. Such objects subsequently showed excellent elastic memory by having the ability to be heat-shrunk over all shorts of substrates and heat-shrunk to their original crosslinked form. The objects showed essentially no distortion due to the crosslinking treatment.

Example III

Various common polyolefin additives were incorporated into a low density polyethylene (DYNH) on a hot 2-roll mill. Slabs were molded approximately 25 mils thick. They were then contacted with t-butyl hydroperoxide at 92° C. for 30 minutes, oxalyl chloride liquid at 22° C. for 10 minutes, and finally a forced draft oven at 75° C. for 30 minutes. The results are summarized below.

TABLE 2

| Additive | Level (p.p.h.) | Modulus of Elasticity at 150° C. (p.s.i.) | Percent Gel Refluxing (Xylene) | Slab Appearance |
|---|---|---|---|---|
| Titanium dioxide | 5 | 20 | 37 | Undistorted. |
| Magnesium oxide | 5 | 70 | 47 | Do. |
| Carbon black [1] | 5 | 30 | 52 | Do. |

[1] Thermax (R. T. Vanderbilt).

Example IV

The following molded slabs from various polyethylene C., and then placed in a forced draft oven at 75° C. for one hour. Gels were determined with reflexing xylene at approximately 135–140° C. Samples treated with either reagent alone or none at all showed zero gel. The results were as follows:

| Sample Name | Time in t-BuOOH | Percent Gel | Sample Appearance | Elastic Memory |
|---|---|---|---|---|
| Zetafin 30 [1] | 10 | 52 | Undistorted | Excellent. |
| EPP [2] X-12703-38-9 | 5 | 71 | do | Do. |
| EPP [2] X-12703-38-9 | 20 | 82 | do | Do. |
| EPP [2] X-12703-38-9 | 30 | 86 | do | Do. |

[1] A polyethylene-ethyl acrylate copolymer sold by Dow Chemical Co.
[2] An ethylene-propylene copolymer offered by Enjay Chemical Co.

Having fully described the invention, it is intended that it be limited only by the lawful scope of the appended claims.

I claim:
1. The method of crosslinking polymers and copolymers of ethylene by the sequential addition of t-alkyl hydroperoxides and oxalyl chloride to form in situ a diperoxyoxalate and subsequently heating the composition to a temperature below the melting point of the polymer, at which temperature said peroxyoxalate decomposes and effects crosslinking of the polymer, said diperoxyoxalate being present in an amount from about 0.05% to 5% by weight of said polymer.
2. The method of claim 1 wherein said hydroperoxide is t-butyl hydroperoxide.
3. The method of claim 1 wherein said polymer is heated to a temperature of from about 10° C. to about 30° C. below its melting point.
4. The method of claim 1 wherein said polymer is polyethylene.
5. The method of claim 1 wherein said polymer is an ethylene-propylene copolymer.
6. The method of claim 1 wherein said polymer is an ethylene-ethyl acrylate copolymer.
7. The method of claim 1 wherein said polymer is an ethylene-butene-1 copolymer.
8. The method of claim 1 where said diperoxyoxalate is present in an amount from about 0.5% to 5% by weight of said polymer.
9. The method of claim 1 wherein said polymer contains a filler which does not interact with the hydroperoxide, the oxalyl chloride or the diperoxyoxalate.
10. The method of claim 1 wherein said polymer contains a filler selected from the group consisting of carbon black, magnesium oxide and titanium dioxide.

References Cited

UNITED STATES PATENTS 3,227,698  1/1966  Robinson _____ 260—94.9
3,140,279  7/1964  Gregorian et al. _____ 260—94.9

FOREIGN PATENTS 845,683  8/1960  Great Britain.

JULIUS FROME, *Primary Examiner.*

S. L. FOX, *Assistant Examiner.*